US008830952B2

(12) United States Patent
Zhu et al.

(10) Patent No.: US 8,830,952 B2
(45) Date of Patent: Sep. 9, 2014

(54) SYSTEM AND METHOD FOR BALANCING NETWORK LOAD IN A NON-TRANSPARENT MULTI-HOP RELAY NETWORK

(75) Inventors: Chenxi Zhu, Gaithersburg, MD (US); Hui Zeng, Greenbelt, MD (US); Wei-Peng Chen, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 717 days.

(21) Appl. No.: 12/414,832

(22) Filed: Mar. 31, 2009

(65) Prior Publication Data

US 2010/0046376 A1 Feb. 25, 2010

Related U.S. Application Data

(60) Provisional application No. 61/090,091, filed on Aug. 19, 2008.

(51) Int. Cl.
H04W 4/00 (2009.01)
H04W 28/08 (2009.01)
H04W 36/22 (2009.01)

(52) U.S. Cl.
CPC .............. H04W 28/08 (2013.01); H04W 36/22 (2013.01)
USPC .......................................... 370/331; 370/338

(58) Field of Classification Search
USPC ......... 370/235, 252, 254, 328, 331, 338, 465, 370/468
See application file for complete search history.

(56) References Cited

U.S. PATENT DOCUMENTS

| 5,771,454 A | 6/1998 | Ohsawa .......................... 455/452 |
| 5,796,722 A * | 8/1998 | Kotzin et al. .................. 370/252 |
| 5,873,037 A | 2/1999 | Zicker et al. ................... 455/450 |
| 6,023,621 A | 2/2000 | Jackson et al. ................ 455/452 |
| 7,852,797 B2 * | 12/2010 | Kang et al. ..................... 370/315 |
| 2004/0001461 A1 * | 1/2004 | Lohtia et al. ................... 370/331 |
| 2008/0031197 A1 | 2/2008 | Wang et al. .................... 370/331 |
| 2008/0125126 A1 * | 5/2008 | Fang et al. ..................... 455/436 |

* cited by examiner

*Primary Examiner* — Yemane Mesfin
*Assistant Examiner* — Mon Cheri Davenport
(74) *Attorney, Agent, or Firm* — Baker Botts L.L.P.

(57) ABSTRACT

A method for balancing network load includes determining an initial capacity of a wireless network comprising a plurality of endpoints coupled to a plurality of different types of access stations. The access stations comprise one or more relay stations and at least one base station. The method also includes identifying one or more endpoints that would increase capacity of the wireless network if switched to a different access station. The method further comprises tentatively switching the identified endpoints from their current access station to a different access station. The method additionally includes determining if the capacity of the wireless network is increased from the initial capacity by the tentative switch and, upon the capacity of the wireless network increasing, switching the identified endpoints from their current access station to a different access station.

21 Claims, 5 Drawing Sheets

SYSTEM AND METHOD FOR BALANCING NETWORK LOAD IN A NON-TRANSPARENT MULTI-HOP RELAY NETWORK

CROSS-REFERENCE TO RELATED APPLICATION

This application claims priority under 35 U.S.C. §119(e) to U.S. Provisional Application Ser. No. 61/090,091, filed Aug. 19, 2008, which is hereby incorporated by reference in its entirety.

TECHNICAL FIELD OF THE INVENTION

This invention relates in general to communication systems and, more particularly, to a system and method for balancing network load in a non-transparent multi-hop relay network.

BACKGROUND OF THE INVENTION

While broadband network services and Voice over IP (VoIP) products continue to grow and expand, so also does the demand for wireless network functionality. To help meet this demand, networks are being developed that use multiple base stations, relay stations, access points or other points of contact. In many scenarios the various base stations, relay stations, access points or other points of contact communicate with one another via wireless channels. One emerging wireless technology is IEEE 802.16,, popularly known as WiMAX. WiMAX provides broadband wireless access, with a single base station providing coverage over a large area (theoretically up to 31, miles). The coverage area of a cell (the area controlled by a particular base station) may be enhanced through the use of relay stations. Other wireless networking technologies include Third Generation (3G), Third Generation Partnership Project (3GPP), and IEEE 802.11,, popularly known as WiFi.

SUMMARY

In accordance with a particular embodiment, a method for balancing network load includes determining an initial capacity of a wireless network comprising a plurality of endpoints coupled to a plurality of different types of access stations. The access stations comprise one or more relay stations and at least one base station. The method also includes identifying one or more endpoints that would increase capacity of the wireless network if switched to a different access station. The method further comprises tentatively switching the identified endpoints from their current access station to a different access station. The method additionally includes determining if the capacity of the wireless network is increased from the initial capacity by the tentative switch and, upon the capacity of the wireless network increasing, switching the identified endpoints from their current access station to a different access station.

Technical advantages of particular embodiments may include increasing the utilized capacity of a wireless network. Accordingly, a wireless network may be able to more efficiently use its available resources, thus increasing the data throughput without having to install additional hardware.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
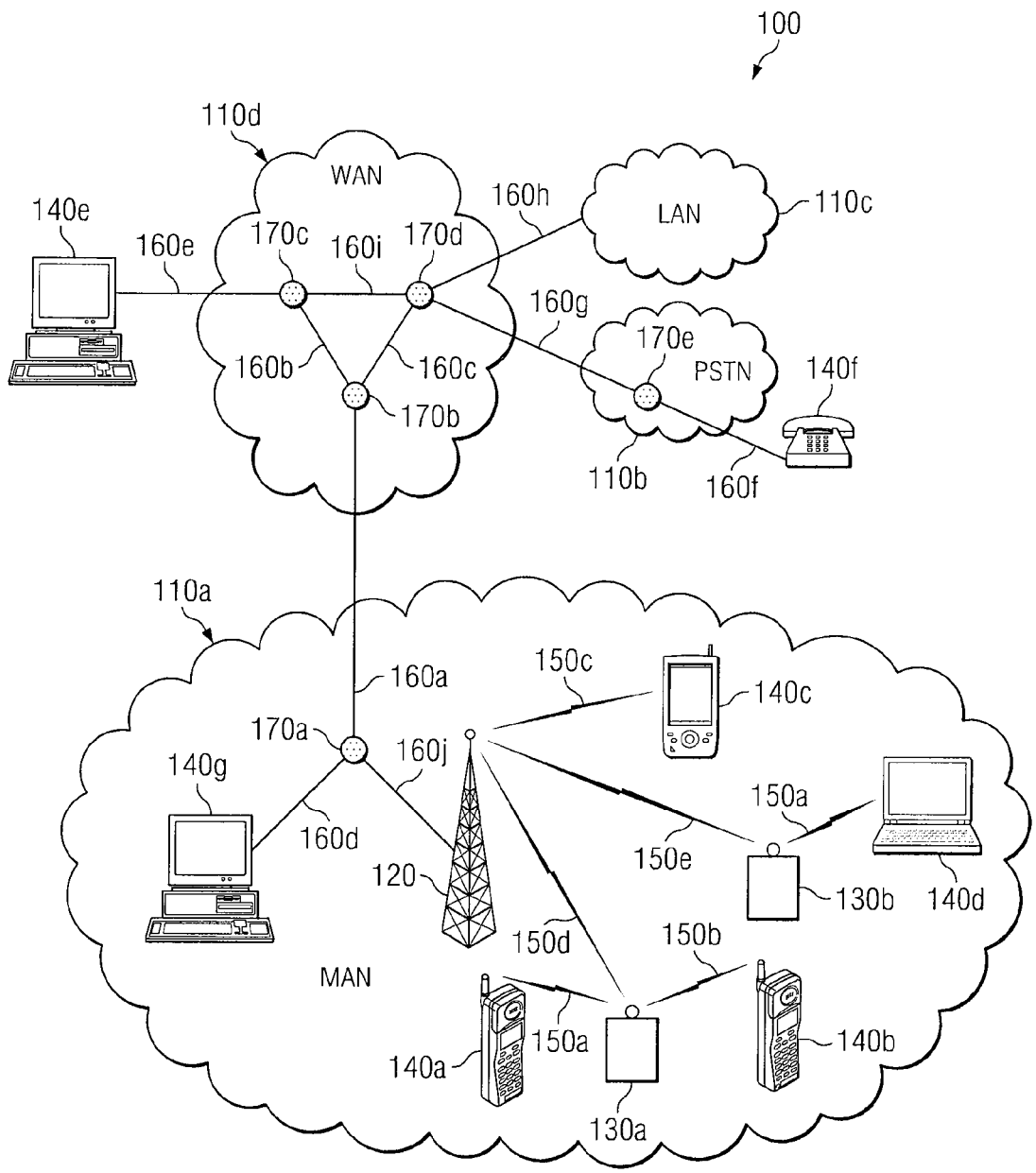
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality that may be provided by a network. Networks 110 may provide their respective services using any of a variety of protocols for either wired or wireless communication. For example, network 110a, may comprise an 802.16, wireless network, popularly known as WiMAX, which may include base stations (e.g., base station 120) and relay stations (e.g., relay stations 130). Network 110a, may provide for the use of relay stations 130 by implementing 802.16j. A WiMAX network that uses relay stations may be referred to as a mobile multi-hop relay (MMR) network.

Although communication system 100 includes four different types of networks, networks 110a-110d,, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d, may be implemented as a LAN, WAN, MAN, PSTN, WiMAX network, global distributed network such as the Internet, Intranet, Extranet, or any other form of wireless or wired networking.

Generally, networks 110a,, 110c,, and 110d, provide for the communication of packets, cells, frames, or other portions of information (generally referred to as packets) between endpoints 140 and/or nodes 170. Networks 110 may include any number and combination of wired links 160, wireless links 150, nodes 170 and/or endpoints 140. For purposes of illustration and simplicity, network 110a, is a MAN that may be implemented, at least in part, via WiMAX, network 110b, is a PSTN, network 110c, is a LAN, and network 110d, is a WAN.

Networks 110 may be connected to each other and with other networks via a plurality of wired links 160, wireless links 150, and nodes 170. Not only do the wired links 160, wireless links 150, and nodes 170 connect various networks but they also interconnect endpoints 140 with one another and with any other components coupled to or a part of any of networks 110. The interconnection of networks 110a-110d, may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d.

In some embodiments, wireless links 150, of network 110a,, may represent wireless links using, for example, WiMAX. Wireless links 150 may comprise two different types of links referred to as a relay link and an access link. An access link may refer to the wireless connection between; a relay link may refer to the wireless connection between a relay station and another relay station or a base station.

A wireless connection, or link, may comprise various wireless resources such as, for example, a combination of a particular center frequency, a particular bandwidth, a particular time slot, and/or a particular subchannel (for example, as described in a downlink or uplink MAP). In particular embodiments, it may be convenient to discuss the amount of resources in terms of slots. Depending on the embodiment, a slot may comprise a particular number of subchannels and symbols (also known as time slots). For example, Section 8.4.3.1, in the Institute of Electrical & Electronics Engineers (IEEE) 802.16e-2005 Standard specifies a slot comprising a single subchannel and two symbols.

The extended range of a WiMAX base station and/or relay station may allow network 110a, to cover the larger geographic area associated with a MAN while using a relatively small number of wired links. More specifically, by properly arranging base station 120 and multiple relay stations 130 around a metropolitan area, the multiple relay stations 130 may use wireless links 150 to communicate with base station 120 and wireless endpoints 140 throughout the metropolitan area. Then base station 120 may, through wired connection 160j, communicate with other base stations, network components not capable of establishing a wireless connection, and/or other networks outside of the MAN, such as network 110d or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170a, may comprise another base station that is wired to base station 120 via link 160j, and to network 110d, via link 160a. As a base station, node 170a, may be able to establish several wireless connections with various other base stations, relay stations, and/or endpoints. As another example, node 170e, may comprise a gateway. This may allow network 110b,, a PSTN network, to be able to transmit and receive communications from other non-PSTN networks, such as network 110d,, an IP network. As a gateway, node 170e, may work to translate communications between the various protocols used by different networks.

Endpoints 140 may provide data or network services to a user through any combination of hardware, software embedded in a computer readable medium, and/or encoded logic incorporated in hardware or otherwise stored (e.g., firmware). For example, endpoints 140a-140g, may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
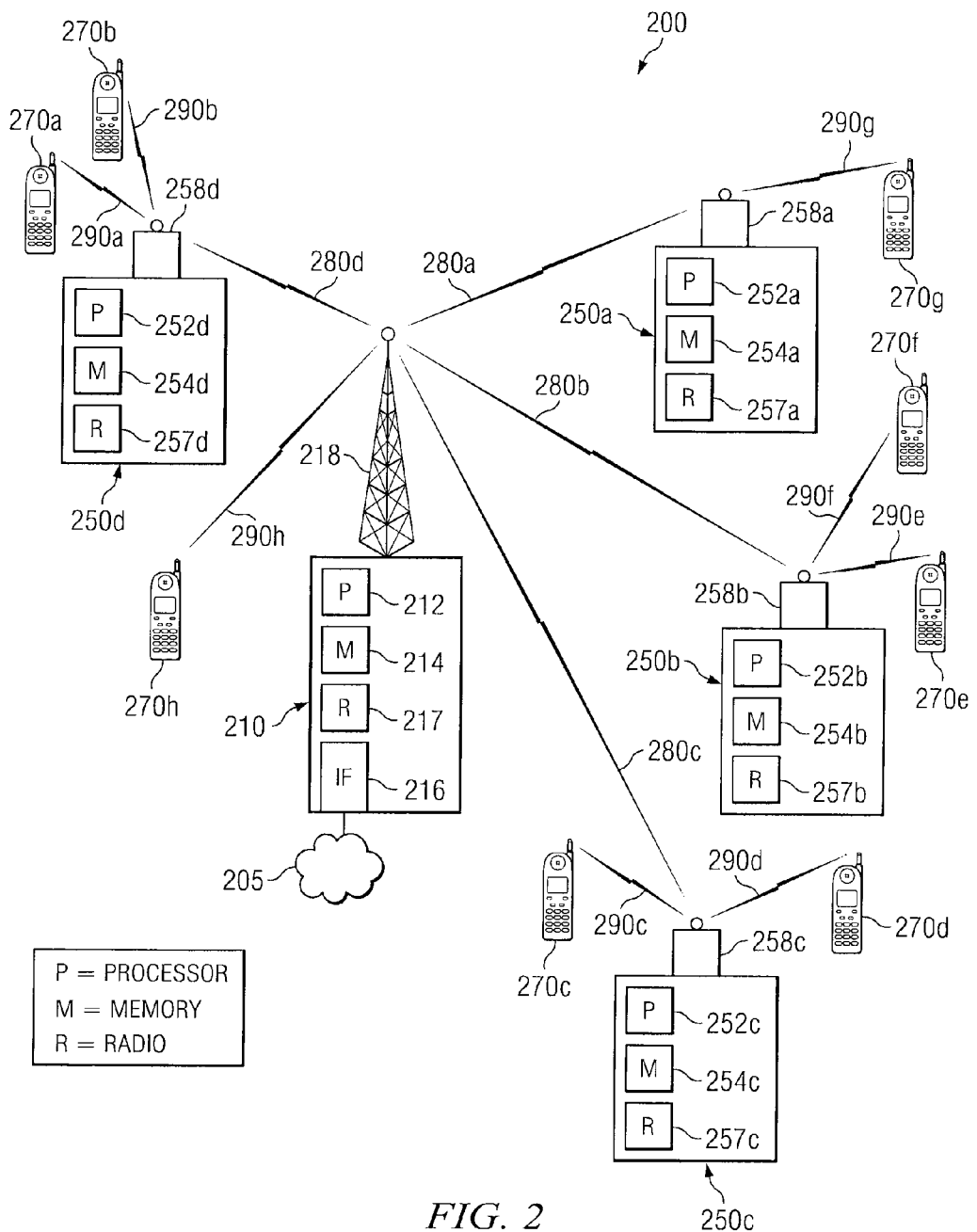
FIG. 2 illustrates a wireless network comprising a more detailed view of a base station and multiple relay stations, in accordance with a particular embodiment.

FIG. 2 illustrates a wireless network comprising a more detailed view of base station 210, in accordance with a particular embodiment. In different embodiments the network may comprise any number of wired or wireless networks, base stations, endpoints, relay stations, and/or any other components that may facilitate or participate in the communication of data and/or signals whether via wired or wireless connections. For simplicity, wireless network 200 of the depicted embodiment comprises wired network 205, base station 210, endpoints 270 and relay stations 250. Base station 210 comprises processor 212, memory 214, interface 216, radio 217 and antenna 218. These components may work together in order to provide base station functionality, such as balancing the network load of traffic within network 200. More specifically, the components of base station 210 may facilitate in optimizing the capacity of network 200 by determining endpoint association (e.g., which access stations the endpoints are coupled to) based on what is best for the network load, as opposed to allowing endpoints 270 to determine their own associations.

Network 205 may comprise one or more of the networks described above with respect to FIG. 1. For example, network 205 may comprise the Internet, a LAN, WAN, MAN, PSTN or some combination of the above.

Processor 212 may be a microprocessor, controller, or any other suitable computing device, resource, or combination of hardware, software and/or encoded logic operable to provide, either alone or in conjunction with other base station 210 components, such as memory 214, base station 210 functionality. Such functionality may include providing various wireless features discussed herein to an endpoint or relay station, such as endpoint 270h, or relay station 250a. For example, processor 212 may determine how to balance the associations of endpoints 270 (e.g., the access station, base station 210 or relay station 250, to which a particular endpoint 270 connects). In particular embodiments, processor 212 may balance the network load to more effectively take advantage of the available capacity of network 200. This may allow network 200 to support more endpoints (or provide improved quality of service) compared to a network in which endpoints 270 simply choose the access station that is best for them. In certain embodiments, as the number and type of endpoints change, processor 212 may be able to adjust the allocation of endpoints among access stations. The adjustments may be made on a frame-by-frame basis.

Memory 214 may be any form of volatile or non-volatile memory including, without limitation, magnetic media, optical media, random access memory (RAM), read-only memory (ROM), flash memory, removable media, or any other suitable local or remote memory component or components. Memory 214 may store any suitable data or information utilized by base station 210, including software embedded in a computer readable medium, and/or encoded logic incorporated in hardware or otherwise stored (e.g., firmware).

In some embodiments memory 214 may store information used by processor 212 in determining how to divide endpoints 270 among base station 210 and relay stations 250. Memory 214 may also store the results and/or intermediate results of the various calculations and determinations performed by processor 212 such as the capacity of network 200. Memory 214 may also maintain a list, database, or other organization of data useful for determining how to route data to the proper endpoints and/or relay stations.

In some embodiments, memory 214 may also store information regarding the quality of wireless links 280 and 290. This quality may be an indication of the efficiency with which a particular link transfers data. Some endpoints 270 connected to relay stations 250 may be able to determine the quality of a potential wireless link should the endpoint connect to base station 210 (and vice-versa for endpoint 270h, connected to base station 210). This information may also be stored by memory 214.

Endpoints 270 and relay stations 250 may use the modulation and coding scheme (MCS) to assess the relative quality of their connections and/or potential connections. The result of the MCS scheme is an MCS value, typically a whole number representing a particular MCS level. A higher MCS level indicates a better quality connection or potential connection. For simplicity, relay station (RS) MCS value will be used to indicate the MCS level of a connection or potential connection between an endpoint and a relay station, base station (BS) MCS value will be used to indicate the MCS level of a connection or potential connection between an endpoint and a base station. The MCS values may be determined by endpoints 270 and sent to base station 210 where they may be stored by memory 214. In particular embodiments, uplink sounding may be used in determining the quality and/or efficiency of the various wireless connections. Uplink sounding may estimate the channel gain and interference strength between multiple relay stations 130 and base station 120.

Base station 210 also comprises interface 216 which may be used for the wired communication of signaling and/or data between base station 210 and network 205. For example, interface 216 may perform any formatting or translating that may be needed to allow base station 210 to send and receive data from network 205 over a wired connection. Interface 216 may also be used to establish any wired connections between base station 210 and other networks or network components.

Radio 217 may be coupled to or a part of antenna 218. Radio 217 may receive digital data that is to be sent out to other base stations, relay stations and/or endpoints via a wireless connection. The wireless connection may use the wireless resources assigned to base station 210. The wireless resources may include, for example, a combination of one or more of a center frequency, bandwidth, time slot, channel, and/or subchannel. In particular embodiments this information may be stored in memory module 214. Radio 217 may convert the digital data into a radio signal having the appropriate center frequency and bandwidth parameters. These parameters may have been determined ahead of time by some combination of processor 212 and memory 214. The radio signal may then be transmitted via antenna 218 for receipt by any appropriate component or device (e.g., relay station 250d). Similarly, radio 217 may convert radio signals received from antenna 218 into digital data to be processed by processor 212.

Antenna 218 may be any type of antenna capable of transmitting and receiving data and/or signals wirelessly. In some embodiments, antenna 218 may comprise one or more omnidirectional, sector or panel antennas operable to transmit/receive radio signals between 2, GHz and 66, GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218 may form a wireless interface. This wireless interface may be used to establish connections with various wireless components, including endpoints and relay stations.

Relay stations 250 may, in essence, be smart repeaters between base station 210 and endpoints 270. Depending on the embodiment and configuration of a relay station, one or more of relay stations 250 may be transparent or non-transparent. From the perspective of an endpoint, a transparent relay station is perceived as though the endpoint were communicating with base station 210 while a non-transparent relay station is perceived as though it were another base station. More specifically, a non-transparent relay station may transmit related control information (e.g. a preamble or downlink/uplink MAP) whereas a transparent relay station may not transmit this information. In particular embodiments, relay stations 250 may comprise components similar to those of base station 210.

Endpoints 270 may be any type of wireless endpoints able to send and receive data and/or signals to and from base station 210 or relay stations 250. Some possible types of endpoints 270 may include desktop computers, PDAs, cell phones, laptops, and/or VoIP phones.

In balancing the network load, processor 212 may determine that certain endpoints need to switch their association either to or from base station 210. Each switch may impact the amount resources available to all the other components of network 200. More specifically, because, as can be seen in FIGS. 3A and 3B discussed below, there may be a fixed amount of resources available during each frame, this fixed amount of resources may then be divided between the access zone and the relay zone for both the uplink and the downlink sub-frames.

Figure 3A:
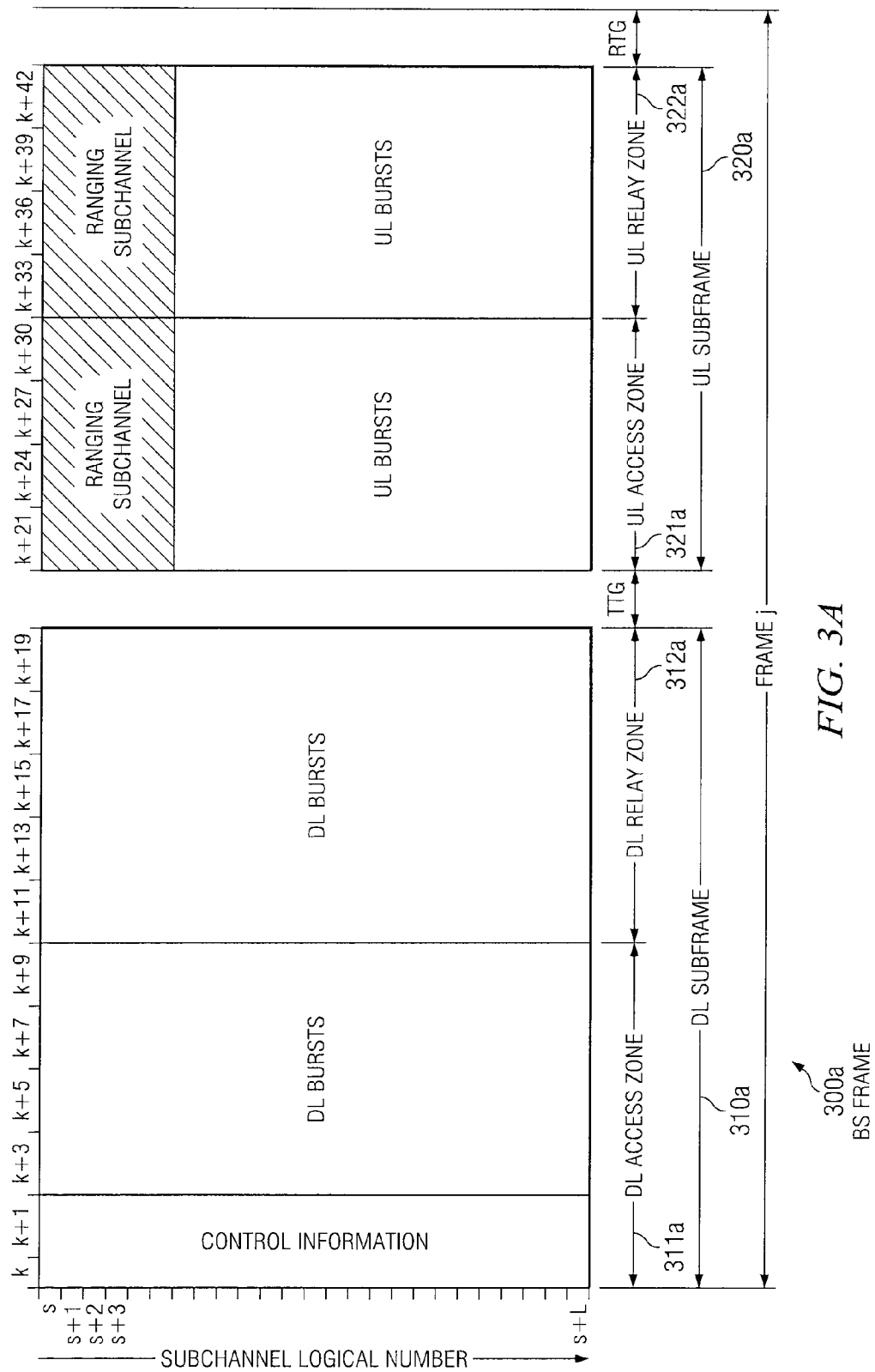
FIGS. 3A and 3B illustrate block diagrams of the frame structure of a base station frame and a relay station frame, respectively, for use with a non-transparent relay station, in accordance with particular embodiments.
Figure 3B:
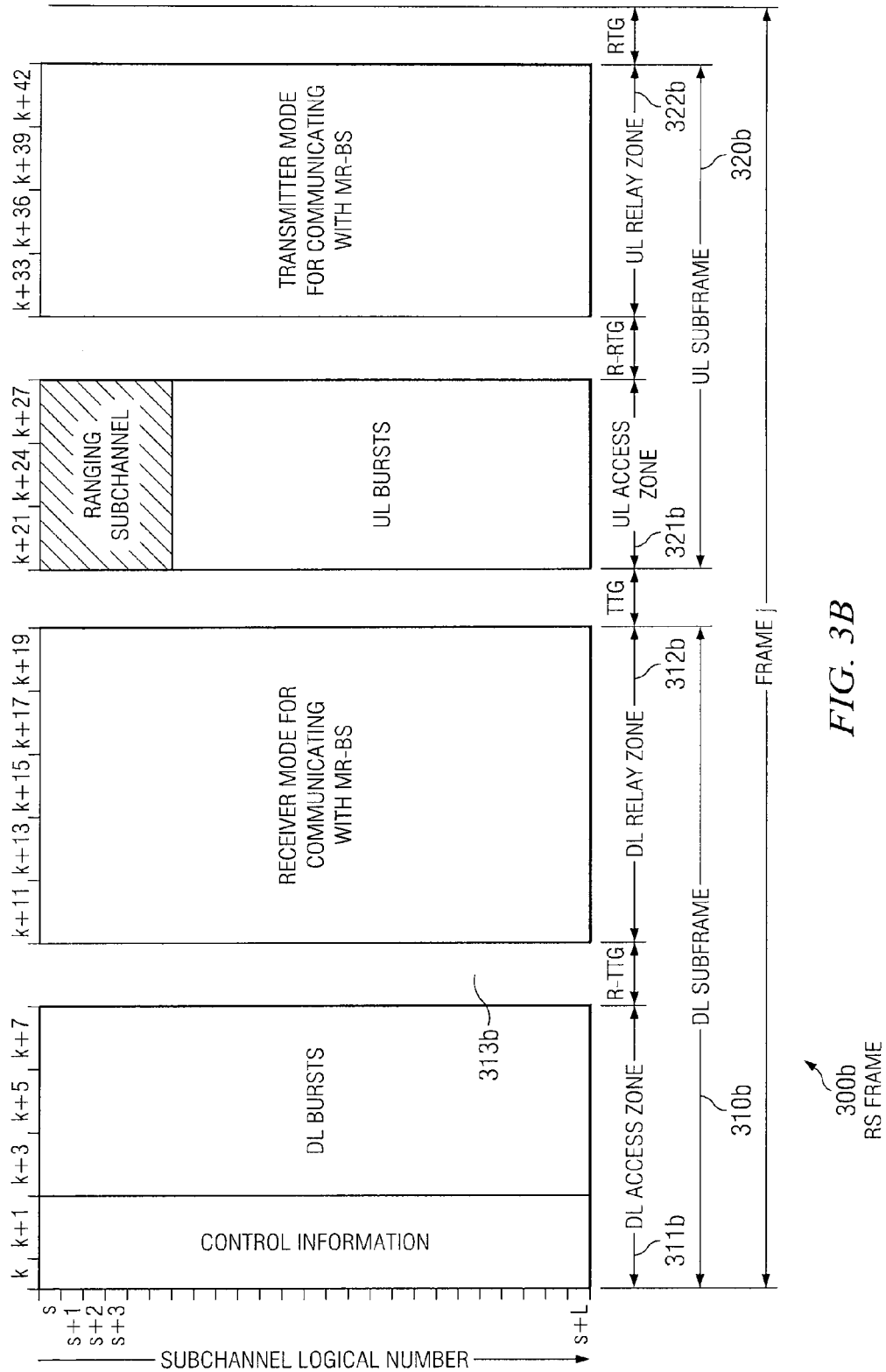

FIGS. 3A and 3B illustrate block diagrams of the frame structure of a base station frame and a relay station frame, respectively, for use with a non-transparent relay station, in accordance with particular embodiments. Frames 300 comprise a fixed number of slots (a slot may comprise a specific time, duration and channel/subchannel). The actual number of slots in frame 300 may depend on the size of a slot and the size of frame 300 specified by the protocol used by network 200. In particular embodiments, a single frame 300 may comprise four-hundred fifty slots. Frames 300 may be broken down into different sub-frames, downlink sub-frame 310 and uplink sub-frame 320. The sub-frames may further be broken down into different zones. For example, downlink sub-frame 310 may comprise a downlink access zone 311 and a downlink relay zone 312. Individual frames as well as the various sub-frames and zones may be separated from one another by transition gaps (e.g., transmit to receive transition gap (TTG) and receive to transmit transition gap (RTG)) to allow the respective radios to make the appropriate transition. In addition, frame 300b, may also include transition 313b, which may provide time for the relay station's radio to transition from transmitting to receiving. Uplink sub-frame 320 may comprise uplink access zone 321 and uplink relay zone 322. The size of these zones may be based on the number of slots used by a particular set of links. For example, the size of relay zone 312 may be based on the number of slots assigned to relay links 280 of FIG. 2. Thus while a frame may be of a fixed size (e.g., duration and channel), the zones within a frame may vary based on the number of slots assigned to, for example, the relay links between a base station and any relay stations.

Within downlink sub-frame 310, downlink access zone 311a, may be used by a base station (e.g., base station 210) to transmit data to any endpoints (e.g., endpoint 270h) connected thereto. Similarly, downlink access zone 311b, may be used by the relay stations (e.g., relay stations 250) to transmit data to any of the endpoints (e.g., endpoints 270a-270g) connected thereto. Because the relay stations are non-transparent they may be able to transmit data to their endpoints at the same time that the base station is transmitting data to its endpoints. In particular embodiments, both downlink access zones 311 may include control information, such as a preamble, and downlink and uplink MAPs. Downlink relay zone 312a, may be used by the base station to transmit data to the relay stations connected thereto. Accordingly, the relay stations may use downlink relay zone 312b, to receive data from the base station.

Within uplink sub-frame 320, uplink access zone 321a may be used by the base station to receive data from any endpoints connected thereto. Similarly, the relay stations may use uplink access zone 321b, to receive data from any of the endpoints connected thereto. Uplink relay zone 322a, may then be used by the base station to receive data from any relay stations connected thereto. Accordingly uplink relay zone 322b, may be used by the relay stations to transmit data to the base station.

The example frame structure discussed above may now be used in discussing some of the potential ways in which the components of base station 210 may work to balance the network load of network 200 to more efficiently use the available resources. It may be assumed, for purposes of the following discussion, that relay stations 250 of wireless network 200 are non-transparent. In balancing the network load, processor 212 may take into account the fact that because a frame is of a fixed size, any changes to the size of one of access zones 311 or 321 or relay zones 312 or 322 may impact the other access zones 311 or 321 or relay zones 312 or 322. These variations in zone sizes may impact the overall capacity of the network. For example, having a large number of endpoints connected to base station 210 may cause relay zones 312 to be relatively small which may then prevent relay stations 250 from fully utilizing their capacity. More specifically, the effective size of access zone 311b, may be limited by the actual size of relay zone 312b, because relay stations 250 may not be able to provide access capacity beyond what may be supported by the relay link capacity.

Accordingly, processor 212 may attempt to balance the load of endpoints 270 to reduce wasted capacity. In particular embodiments, processor 212 may begin to balance network 200 by initially associating a relatively small number of endpoints with base station 210 and the rest with relay stations 250. Processor 212 may then begin to re-distribute endpoints 270 to increase capacity. In particular embodiments, network 200 may approach its optimal capacity when the throughput of relay zones 312 and 322 is less than access zones 311 and 321. In other words, to the extent network 200 incurs a bottleneck, it may be desirable for the bottleneck to occur in relay zones 312 and 322 instead of access zones 311 and 321.

In some embodiments, wireless network 200 may be provisioned so that each endpoint receives an equal number of wireless resources. This may be referred to as "resource fair." While each endpoint 270 may receive an approximately equal amount of wireless resources, the data rate they may receive may vary. For example, a particular endpoint that is in an area with poor signal strength may receive a lower data rate than a more efficient endpoint using the same amount of wireless resources.

In providing each endpoint with an approximately equal amount of wireless resources, it may be desirable to also account for the amount of wireless resources used for the relay link. More specifically, changes in the amount of wireless resources used by the access links of the endpoints connected to a particular relay station may cause changes in the amount of wireless resources used for the respective relay link. Because the efficiency of the relay link may not match the efficiency of the access links, there may not be a one-to-one correspondence between the cumulative amount of resources used for the access links and the amount of resources used for the relay link. Furthermore, as the amount of resources used for the relay links increases, the amount of resources available for access links associated with the base station and the relay stations decreases.

Depending on the embodiment, in a resource fair scheme, processor 212 may use a variety of techniques and/or algorithms to determine an optimal access station association for endpoints 270 of network 200. For example, processor 212 may use an accurate, but computationally expensive, non-linear optimization algorithm. Another technique may comprise a heuristic step-by-step switch-based scheme in which endpoints 270 are switched one-by-one until an optimal capacity is achieved.

In both schemes, processor 212 may create a distribution matrix and store it in memory 214. The distribution matrix may be populated with values that indicate the number of endpoints having a particular BS MCS level and a certain RS MCS level. For example, if the distribution matrix is denoted as D then element $D_{2,4,1}$ may be the number of endpoints connected to relay station 2, whose highest BS MCS level is 4, and whose highest RS MCS level with relay station 2, (e.g., relay station 250b) is 1. From the distribution matrix it may be possible for processor 212 to generate a BS matrix (also referred to as a BS association matrix) formed from the number of endpoints 270 in the distribution matrix which are associated with base station 210. In other words, if the BS association matrix is denoted as n then $n_{m,i,j}$, would be the number of endpoints in $D_{m,i,j}$, that are served by the respective base station (e.g., $n_{m,i,0}$, would be equal to $D_{m,i,0}$, because any endpoints having an RS MCS level equal to zero and a BS MCS level greater than zero (e.g., the endpoint cannot be serviced by relay station 270 but can be serviced by base station 210) would be assigned to the base station). For endpoints that can not be serviced by base station 210, n may be equal to zero.

These matrices may be used by processor 212 to identify, for each relay station 250, the endpoint having the highest BS MCS level from among the endpoints (if any) at each RS MCS level with respect to the respective relay station 250. The identified endpoint may be tentatively switched to base station 210 and the capacity re-calculated after the switch. In some embodiments, multiple endpoints may be identified, for each identified endpoint the resulting capacity of tentatively switching the endpoint may be calculated. The resulting capacities may then be compared with each other to determine which of the identified endpoints results in the highest re-calculated capacity. If the switch increases capacity then the switch is made permanent, if the switch does not increase capacity then the tentative switch is undone.

This may be seen in the context of an example. Processor 212 may upload from memory 214 information related to the various MCS levels from endpoints 270 (e.g., the distribution matrix discussed above) and how endpoints 270 are connected to base station 210 (e.g., directly or through one of relay stations 250). Processor 212 may then begin to assess endpoints 270a-270g, connected to relay stations 250. The assessments may be made one relay station at a time. For example, processor 212 may begin by assessing the endpoints connected to relay station 250a,, then proceeding to relay station 250b, followed by relay station 250c, and ending with relay station 250d. In assessing each relay station, processor 212 may further assess each RS MCS level for endpoints connected to a particular relay station.

Assume, for purposes of this example, that in analyzing relay station 250b,, the RS MCS level of endpoints 270e, and 270f, is three and the BS MCS level is two for endpoint 270e, and four for endpoint 270f; (it may also be assumed that the MCS levels are arranged in ascending order based on the transmission spectrum efficiency between the endpoint and the base station or relay station, as appropriate). Processor 212 may then tentatively switch endpoint 270f, to base station 210 because it has the higher BS MCS level among endpoints having an RS MCS level of three. Processor 212 may then compare the capacity of network 200 with endpoint 270f connected to base station 210 against the capacity with endpoint 270f, connected to relay station 250. The connection resulting in the higher capacity may be the connection used by endpoint 270f.

In particular embodiments, a while loop may be used to determine the endpoints to switch from a particular relay station to the base station. An example of such a loop is provided below. In particular embodiments, before the loop below is executed, the distribution matrix D=$\{D_{m,i,j}\}$, and the matrix n=$\{n_{m,i,j}\}$, discussed above, may be determined. It may also be desirable to determine the initial capacity so that it may be possible to determine if a particular switch has or has not increased network capacity. The variables new_, C and max_, C may both be initialized with the initial capacity of the wireless network, and the variable max_, n may be initialized with n. Furthermore, k_, bs(m,j) may represent the candidate endpoint (e.g., the endpoint with the highest BS MCS level) which is currently served by the RS identified as "m" and has an RS MCS level of "j" and Cand_, C(m, j) is the calculated capacity (using for example, equations 1-3, presented below) if the candidate endpoint is switched from relay station "m" to the base station.

```
1.   While (new_C ≥ max_C · (1 − δ)) && (sum(n) < sum(D))
2.   {
3.       C = new_C;
4.       For m = 1 : M
5.       {
6.           For j = 1 : ML
7.           {
8.               k_bs(m, j) = max(i: n_{m, i, j} < D_{m, i, j}) ;
9.               i = k_bs(m, j); n_{m, i, j} = n_{m, i, j} + 1;
10.              Update Cand_C(m, j);
11.              n_{m, i, j} = n_{m, i, j} − 1;
12.          }
13.      }
14.      (m_s, j_s) = argmax(Cand_C(m, j));
15.      new_C = max(Cand_C(m, j));
16.      i_s = k_bs(m_s, j_s); n_{m_s, i_s, j_s} = n_{m_s, i_s, j_s} + 1;
17.      If (new_C > max_C)
18.      {
19.          max_C = new_C; max_n = n;
20.      }
21.  }
```

The loop depicted above may continue until the new capacity (new_, C), the capacity after tentatively switching an endpoint, has decreased more than a predetermined amount (δ) below the maximum capacity (max_, C) of the network. Beginning at line 4, the loop steps through each relay station (m), and for each relay station it steps through each of the RS MCS levels (j) associated with endpoints connected to the respective relay station. At line 13,, at the end of the two "For" loops, the endpoint that is likely to provide the greatest increase in capacity has been determined. Then, beginning at line 14, the new capacity and the endpoint association for the base station are updated.

The loop above makes extensive use of capacity calculations. There are numerous techniques that may be used to determine the capacity of the network. In some embodiments, one or more of the following equations may be used in determining network capacity:

$$\begin{cases} L_{i,j} \cdot r_{i,j} = z_{i,j} \cdot R_j, \, j = 1, 2, \ldots, M \\ L_{i,j} + z_{i,j} = (L_j + z_j)/N_j \\ (L_j + z_j)/N_j = (L+z)\Big/\sum_{k \neq 0} N_k \\ (L+z)\Big/\sum_{k \neq 0} N_k = (S-z)/N_0 \\ (S-z)/N_0 = (S+L)/N \end{cases} \quad (1)$$

$$L_j = \frac{z \cdot \sum_{i \in I_j} \frac{R_j}{R_j + r_{i,j}}}{\sum_j \sum_{i \in I_j} \frac{r_{i,j}}{R_j + r_{i,j}}}, \, j = 1, 2, \ldots, M \quad (2)$$

$$C = \frac{s-z}{N_0} \sum_{i \in I_0} r_{i,0} + \frac{z \cdot \sum_{j \neq 0} \sum_{i \in I_j} \frac{R_j \cdot r_{i,j}}{R_j + r_{i,j}}}{\sum_{j \neq 0} \sum_{i \in I_j} \frac{r_{i,j}}{R_j + r_{i,j}}}, \, j = 1, 2, \ldots, M \quad (3)$$

In the above equations, equation (1) is a series of interrelated equations focusing on the amount of resources consumed in a multi-hop link. The first equation of (1) may represent rate balancing in 2-hop links (e.g., links that include at least one relay station); the second equation of (1) may ensure a resource fair distribution of resources among endpoints connected to relay station j; the third equation of (1) extends the resource fair distribution to all endpoints served by a relay station; the fourth equation of (1) may ensure a resource fair distribution of resources among those endpoints connected to a base station and those endpoints connected to a relay station; and finally the fifth equation of (1) may be a direct result of the third and fourth equations of (1). Equation (2) may be used to determine the total amount of resources actually consumed by endpoints coupled to a particular relay station. Equation (3) may be used to calculate the total capacity of the network. Equation (3) may reflect the fact that each $L_j$, is less than or equal to $L_T$, where $L_T$, is defined as the (size of a frame)−(the amount of resources of two symbols)−(number of slots).

In particular embodiments, it may be desirable to add an endpoint to network 200 after an optimal association has been determined. This may be done, for example, by first updating the distribution matrix D and BS matrix n, discussed above, to include the new endpoint. The BS matrix may be updated using the following equations:

$$\begin{cases} n_{mm,ii,jj} = n_{mm,ii,jj} + 1, n_{mm,kk,jj} = n_{mm,kk,jj} - 1, \\ \qquad\qquad \text{if } jj > 0 \text{ and } ii < kk = \text{k\_bs}(mm, jj) \\ n_{mm,ii,jj} = n_{mm,ii,jj} + 1, \text{if } jj = 0 \end{cases}$$

Then $n_{m, i, j} = n_{m, i, j} - 1$, if i=k_, bs (m, j) and j>0. After updating $n_{m, j, j}$, it may be possible to then re-run the while loop disclosed above.

Although particular embodiments have been described using various MCS levels, it should be understood that various other techniques or standards may be used to assess the quality of a connection and/or the likely impact on capacity it may have.

Figure 4:
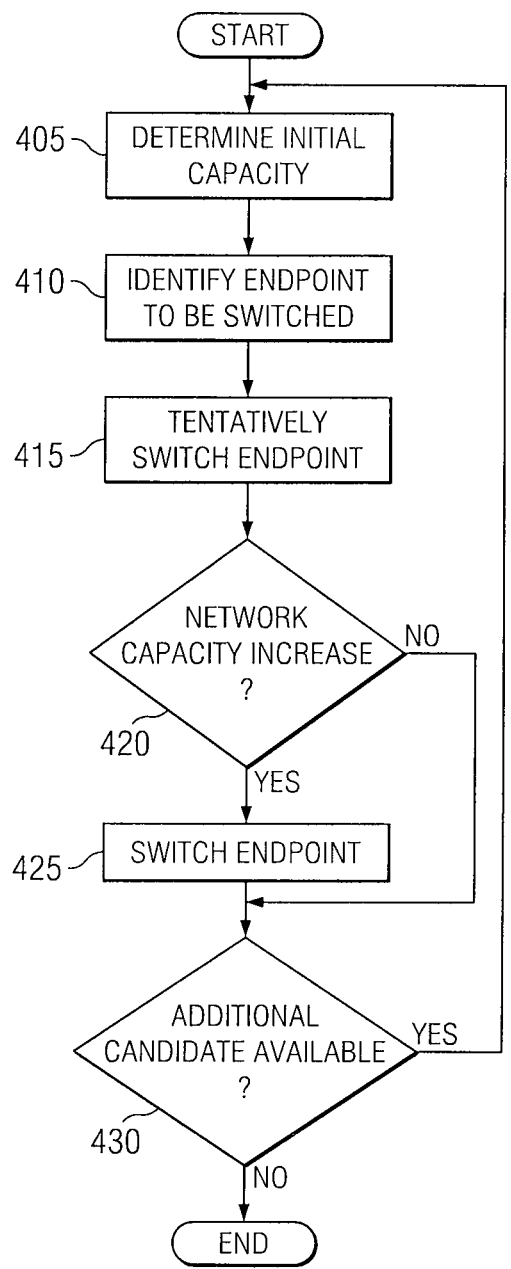
FIG. 4 illustrates a method for balancing network load, in accordance with particular embodiments.

FIG. 4 illustrates a method for balancing network load, in accordance with particular embodiments. It may be assumed that the network in question comprises a base station, at least one non-transparent relay station and a plurality of endpoints. The base station may be aware of these various entities through information received in various signaling messages specified by the wireless protocol being used (e.g., WiMAX). In certain embodiments, the endpoints of the network may initially be associated primarily with relay stations, leaving a relatively small number endpoints associated with the base station.

The method begins at step 405 with a determination of the initial capacity of the wireless network. This initial capacity may be used as a baseline for subsequent capacity comparisons to determine if switching a particular endpoint increases the network capacity. For any subsequent iteration, after the first iteration, the initial capacity may be updated to reflect the capacity impact of switching (or tentatively switching) an endpoint in the previous iteration. The actual capacity may vary depending on numerous different variables, including, but not limited to, the fairness scheme being employed (e.g., rate-fair or resource-fair), the number of relay stations and endpoints present, the quality of the various access links and relay links (e.g., their respective MCS level values), and the frame partition size. For purposes of this method, it may be assumed that a resource fair distribution scheme is being employed. The information used by the base station to determine the initial capacity may have been received from the various wireless entities of the wireless network as part of the signaling exchanged during normal operation.

At step 410 an endpoint to be switched from its current access station to a different access station is identified. For example, if the endpoint is currently connected to a particular relay station, the endpoint may be switched to the base station. The identified endpoint may be one that would likely increase the network capacity if switched. The process of selecting the endpoint to be switched may vary between embodiments. While the network may comprise several endpoints, not all endpoints may be eligible to be switched. More specifically, some endpoints may only be able to establish a connection with a single access station. Accordingly, the number of possible endpoints that may be identified may be reduced to only those endpoints that are capable of being switched.

At step 415 the identified endpoint is tentatively switched (e.g., assuming that the endpoint has been switched for purposes of determining capacity while actually maintaining its current association). In particular embodiments, multiple endpoints may be tentatively switched (e.g., one at a time) to determine which endpoint would result in the greatest capacity. In some embodiments, the endpoints that are tentatively switched are selected based on the quality of their connections or potential connections with different access stations. For example, in some embodiments, the base station may select an endpoint connected to a relay station that has a relatively low RS MCS value and a relatively high BS MCS value. The relativity of the RS MCS values may be based on a comparison of all the endpoints in the network (e.g., all the endpoints connected to the base station either directly or indirectly), or just the endpoints connected to a particular relay station. The base station may use the MCS values because a relatively low MCS value may indicate a relatively inefficient connection while a relatively high MCS value may indicate a relatively efficient link. Accordingly, by selecting an endpoint with a relatively low MCS value with its current access station and a relatively high MCS value with a different access station it is likely to generate a relatively large increase in capacity.

At step 420 it is determined whether switching the identified endpoint increases the network's capacity. This may comprise changing the zone size assigned to the relay zone and access zone. The capacity resulting from tentatively switching the identified endpoint is then compared with the initial capacity to determine if making the switch increases the network's capacity.

If network capacity is increased, then at step 425 the identified endpoint is switched from its current access station to its new access station. In other words, the tentatively switched endpoint is actually switched at step 425. If network capacity is not increased then the identified endpoint is not switched. In others, the tentatively switched endpoint is not actually switched and the network capacity is not changed.

Regardless of whether switching the endpoint increases the network's capacity, if there are additional candidate endpoints to be examined, the method returns to step 405 and repeats steps 405-430, as appropriate. The criteria used at step 430 in determining whether there are any additional candidate endpoints available may vary depending on the embodiment. For example, in some embodiments, it may be determined that there are no additional candidate endpoints once all the endpoints that are eligible to be switched in the network have been examined. As another example, in some embodiments, it may be determined that there are no additional candidate endpoints once an endpoint fails to increase network capacity. In other words, if the endpoint that is identified is the most likely to result in an increase, and it fails to increase capacity, it may be assumed that any other potential endpoints would similarly fail to increase network capacity. Thus, in these embodiments, once a particular endpoint fails to increase network capacity after being tentatively switched, there would be no need to examine any further candidate endpoints. As another example, it may be determined that there are no additional candidate endpoints after a certain number of identified endpoints fail to increase network capacity after being tentatively switched.

Depending on the embodiment, the capacity of the network may be increased all at once or in incremental steps. More specifically, in certain embodiments, each identified endpoint may be switched before any additional endpoints are identified. Thus, the method may be repeated several times until step 410 is unable to identify any endpoints that would be able to increase capacity upon being switched. Thus, the capacity of the network is increased in increments, one endpoint at a time. In some embodiments, the method may identify all the endpoints that are to be switched before making any actual switches. Then, at step 425 all the selected endpoints may be switched. Thus, the capacity may be increased all at once. In certain embodiments, the method may determine what combination of endpoints results in the greatest increase in capacity of the network. Then, at step 425 these endpoints may be switched.

In some embodiments, the steps depicted in FIG. 4 may be repeated on a frame-by-frame basis. In other words, the base station may determine the association resulting in the maximum capacity for each frame. In certain embodiments the steps depicted in FIG. 4 may be repeated upon detecting a trigger, such as an endpoint joining or leaving the network or the passage of a particular amount of time (e.g., a periodic cycle).

Some of the steps illustrated in FIG. 4 may be combined, modified or deleted where appropriate, and additional steps may also be added to the flowchart. For example, in some embodiments the method may include a step of ensuring that it has provided all the endpoints of the network with an approximately equal data rate or with approximately the same number of wireless resources. Additionally, steps may be performed in any suitable order without departing from the scope of particular embodiments.

Although particular embodiments have been described in detail, it should be understood that various other changes, substitutions, combinations and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for balancing network load, comprising:
   determining an initial capacity of a wireless network comprising a plurality of endpoints coupled to a plurality of access stations, the access stations comprising one or more relay stations and at least one base station;
   identifying one or more endpoints that would increase capacity of the wireless network if switched to a different access station;
   tentatively switching the identified endpoints from their current access station to a different access station, wherein the tentative switch comprises a temporary switch occurring until it is determined if the capacity of the wireless network is increased from the initial capacity by the tentative switch;
   determining, after the tentative switch of the identified endpoints, if the capacity of the wireless network is increased from the initial capacity by the tentative switch; and
   upon the capacity of the wireless network increasing, switching the identified endpoints from their current access station to the different access station.

2. The method of claim 1, further comprising:
   communicating information among the plurality of access stations and endpoints using a frame structure comprising a relay zone to communicate information between the one or more relays stations and the at least one base station and an access zone to communicate information between the plurality of endpoints and the plurality of access stations; and
   changing a zone size assigned to the relay zone and a zone size assigned to the access zone.

3. The method of claim 1, further comprising providing each of the plurality of endpoints with an approximately equal amount of wireless resources.

4. The method of claim 1, further comprising receiving at least one modulation and coding scheme value from each of the plurality of endpoints.

5. The method of claim 1, wherein identifying the endpoints comprises using at least two modulation and coding scheme values to identify one or more endpoints that would increase capacity of the wireless network if switched to a different access station.

6. The method of claim 1, further comprising:
   upon the capacity of the wireless network decreasing more than a first amount from the initial capacity, determining that the wireless network has reached an optimal association; and
   upon detecting the presence of a new endpoint, dynamically adding the new endpoint to the wireless network, and re-determining the optimal association to include the new endpoint.

7. The method of claim 1, wherein identifying the endpoints that would increase capacity of the wireless network if switched to a different access station comprises:
   for each relay station of the plurality of access stations, identifying, for each modulation and coding scheme value associated with the relay station, one or more potential endpoints comprising a relatively high modulation and coding scheme value with a base station; and
   identifying at least one endpoint, from among the potential endpoints, that would result in the greatest increase in capacity of the wireless network.

8. A device for balancing network load, comprising a processor operable to:
   determine an initial capacity of a wireless network comprising a plurality of endpoints coupled to a plurality of access stations, the access stations comprising one or more relay stations and at least one base station;
   identify one or more endpoints that would increase capacity of the wireless network if switched to a different access station;
   tentatively switch the identified endpoints from their current access station to a different access station, wherein the tentative switch comprises a temporary switch occurring until it is determined if the capacity of the wireless network is increased from the initial capacity by the tentative switch;
   determine, after the tentative switch of the identified endpoints, if the capacity of the wireless network is increased from the initial capacity by the tentative switch; and
   upon the capacity of the wireless network increasing, switch the identified endpoints from their current access station to the different access station.

9. The device of claim 8:
   further comprising an interface coupled to the processor and operable to communicate information among the plurality of access stations and endpoints using a frame structure comprising a relay zone to communicate information between the one or more relays stations and the at least one base station and an access zone to communicate information between the plurality of endpoints and the plurality of access stations; and wherein the processor is further operable to change a zone size assigned to the relay zone and a zone size assigned to the access zone.

10. The device of claim 8, wherein the processor is further operable to provide each of the plurality of endpoints with an approximately equal amount of wireless resources.

11. The device of claim 8, further comprising an interface coupled to the processor and operable to receive at least one modulation and coding scheme value from each of the plurality of endpoints.

12. The device of claim 8, wherein the processor operable to identify the endpoints comprises a processor operable to use at least two modulation and coding scheme values to identify one or more endpoints that would increase capacity of the wireless network if switched to a different access station.

13. The device of claim 8, wherein the processor is further operable to:

upon the capacity of the wireless network decreasing more than a first amount from the initial capacity, determine that the wireless network has reached an optimal association; and upon detecting the presence of a new endpoint, dynamically add the new endpoint to the wireless network, and re-determine the optimal association to include the new endpoint.

14. The device of claim 8, wherein the processor operable to identify the endpoints that would increase capacity of the wireless network if switched to a different access station comprises a processor operable to:

for each relay station of the plurality of access stations, identify, for each modulation and coding scheme value associated with the relay station, one or more potential endpoints comprising a relatively high modulation and coding scheme value with a base station; and identify at least one endpoint, from among the potential endpoints, that would result in the greatest increase in capacity of the wireless network.

15. Logic embodied in a non-transitory tangible computer readable medium that when executed is operable to:

determine an initial capacity of a wireless network comprising a plurality of endpoints coupled to a plurality of access stations, the access stations comprising one or more relay stations and at least one base station;

identify one or more endpoints that would increase capacity of the wireless network if switched to a different access station;

tentatively switch the identified endpoints from their current access station to a different access station, wherein the tentative switch comprises a temporary switch occurring until it is determined if the capacity of the wireless network is increased from the initial capacity by the tentative switch;

determine, after the tentative switch of the identified endpoints, if the capacity of the wireless network is increased from the initial capacity by the tentative switch; and upon the capacity of the wireless network increasing, switch the identified endpoints from their current access station to the different access station.

16. The medium of claim 15, wherein the logic, when executed, is further operable to:

communicate information among the plurality of access stations and endpoints using a frame structure comprising a relay zone to communicate information between the one or more relays stations and the at least one base station and an access zone to communicate information between the plurality of endpoints and the plurality of access stations; and change a zone size assigned to the relay zone and a zone size assigned to the access zone.

17. The medium of claim 15, wherein the logic, when executed, is further operable to provide each of the plurality of endpoints with an approximately equal amount of wireless resources.

18. The medium of claim 15, wherein the logic, when executed, is further operable to receive at least one modulation and coding scheme value from each of the plurality of endpoints.

19. The medium of claim 15, wherein the logic, when executed, is further operable to identify the endpoints comprises a medium operable to use at least two modulation and coding scheme values to identify one or more endpoints that would increase capacity of the wireless network if switched to a different access station.

20. The medium of claim 15, wherein the logic, when executed, is further operable to:

upon the capacity of the wireless network decreasing more than a first amount from the initial capacity, determine that the wireless network has reached an optimal association; and upon detecting the presence of a new endpoint, dynamically add the new endpoint to the wireless network, and re-determine the optimal association to include the new endpoint.

21. The medium of claim 15, wherein the logic that when executed is operable to identify the endpoints that would increase capacity of the wireless network if switched to a different access station comprises logic that when executed is further operable to:

for each relay station of the plurality of access stations, identify, for each modulation and coding scheme value associated with the relay station, one or more potential endpoints comprising a relatively high modulation and coding scheme value with a base station; and identify at least one endpoint, from among the potential endpoints, that would result in the greatest increase in capacity of the wireless network.

* * * * *